United States Patent [19]

Kinsey

[11] 3,802,549

[45] Apr. 9, 1974

[54] DEVICE FOR HANDLING ARTICLES SUCH AS BOTTLE OR JAR TYPE CONTAINERS

[75] Inventor: James L. Kinsey, Arlington Heights, Ill.

[73] Assignee: Alpeda Industries, Inc., Golf, Ill.

[22] Filed: Mar. 30, 1972

[21] Appl. No.: 239,524

[52] U.S. Cl.................. 198/165, 198/160, 198/162
[51] Int. Cl............................................. B65g 15/14
[58] Field of Search..................... 198/165, 160, 162

[56] References Cited
UNITED STATES PATENTS

| | | | |
|---|---|---|---|
| 2,862,606 | 12/1958 | Schlichting | 198/165 |
| 3,208,613 | 9/1965 | Brainard | 214/308 |
| 3,124,231 | 3/1964 | Ott, Jr. | 198/165 |
| 1,811,201 | 6/1931 | Kleineberg | 198/165 |
| 1,096,918 | 5/1914 | Johnson | 198/165 |
| 3,170,564 | 2/1965 | Gatto | 198/165 |
| 3,068,920 | 12/1962 | Chandler et al. | 198/165 |

Primary Examiner—Richard E. Aegerter
Assistant Examiner—Joseph E. Valenza
Attorney, Agent, or Firm—Hill, Sherman, Meroni, Gross & Simpson

[57] ABSTRACT

Articles such as bottles or jars are delivered to main endless flexible carriers such as belts trained to run in face-to-face relation to grip the articles for transportation along a treatment path, the articles being liable due to length relationship and limitations upon adjustment of the article delivery means and the carriers, to project from one side of the carriers. This situation is alleviated by gripping of the articles by respective supplemental endless flexible carriers trained to run cooperatively along and with said side of the main carriers for stabilized carrying of the articles. The main and supplemental carriers run synchronously.

12 Claims, 6 Drawing Figures

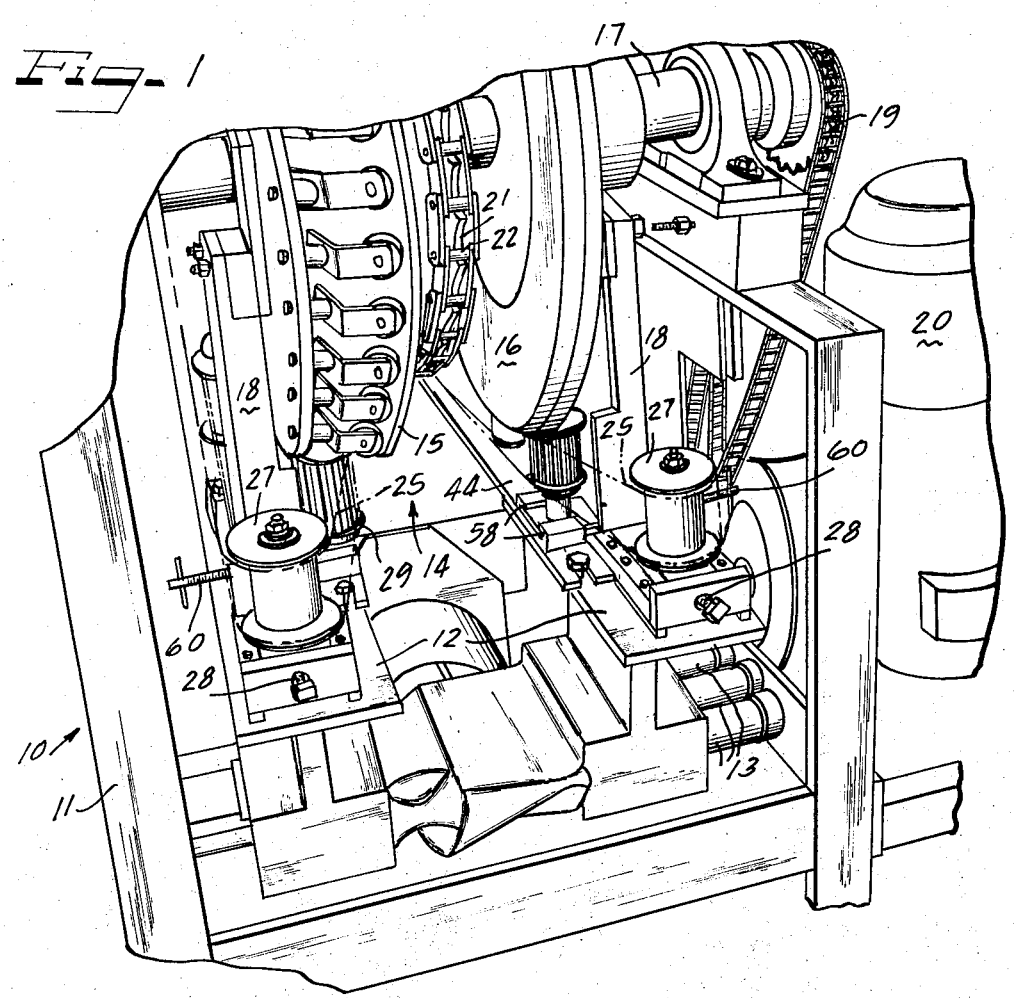
Fig. 1
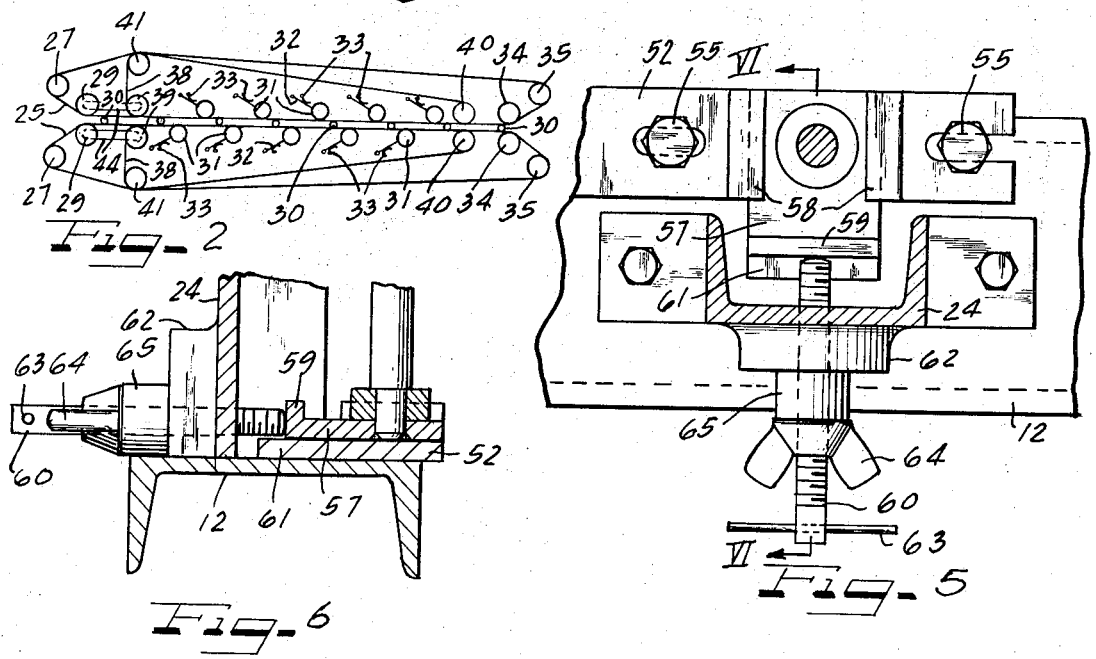
Fig. 2
Fig. 6
Fig. 5

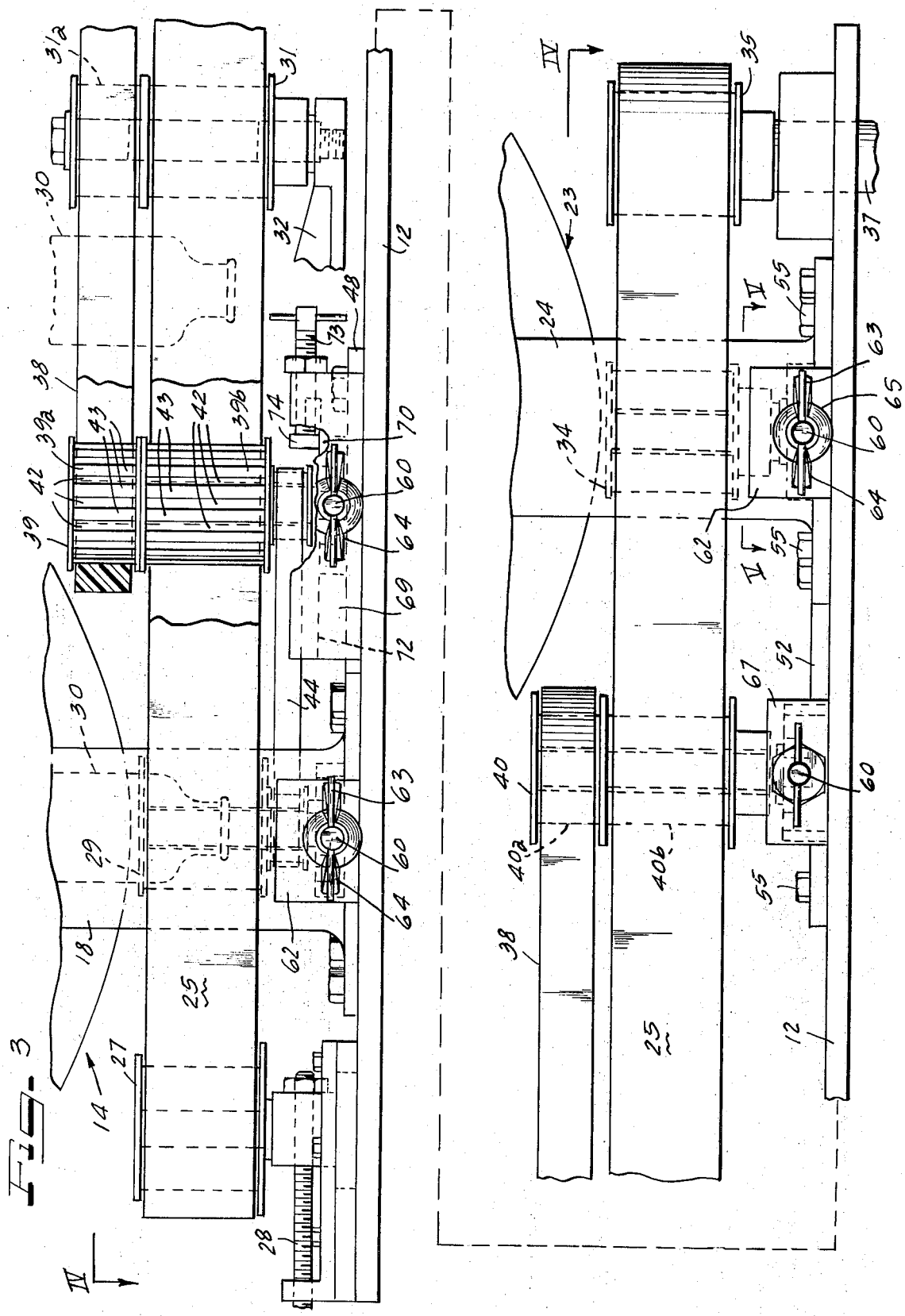

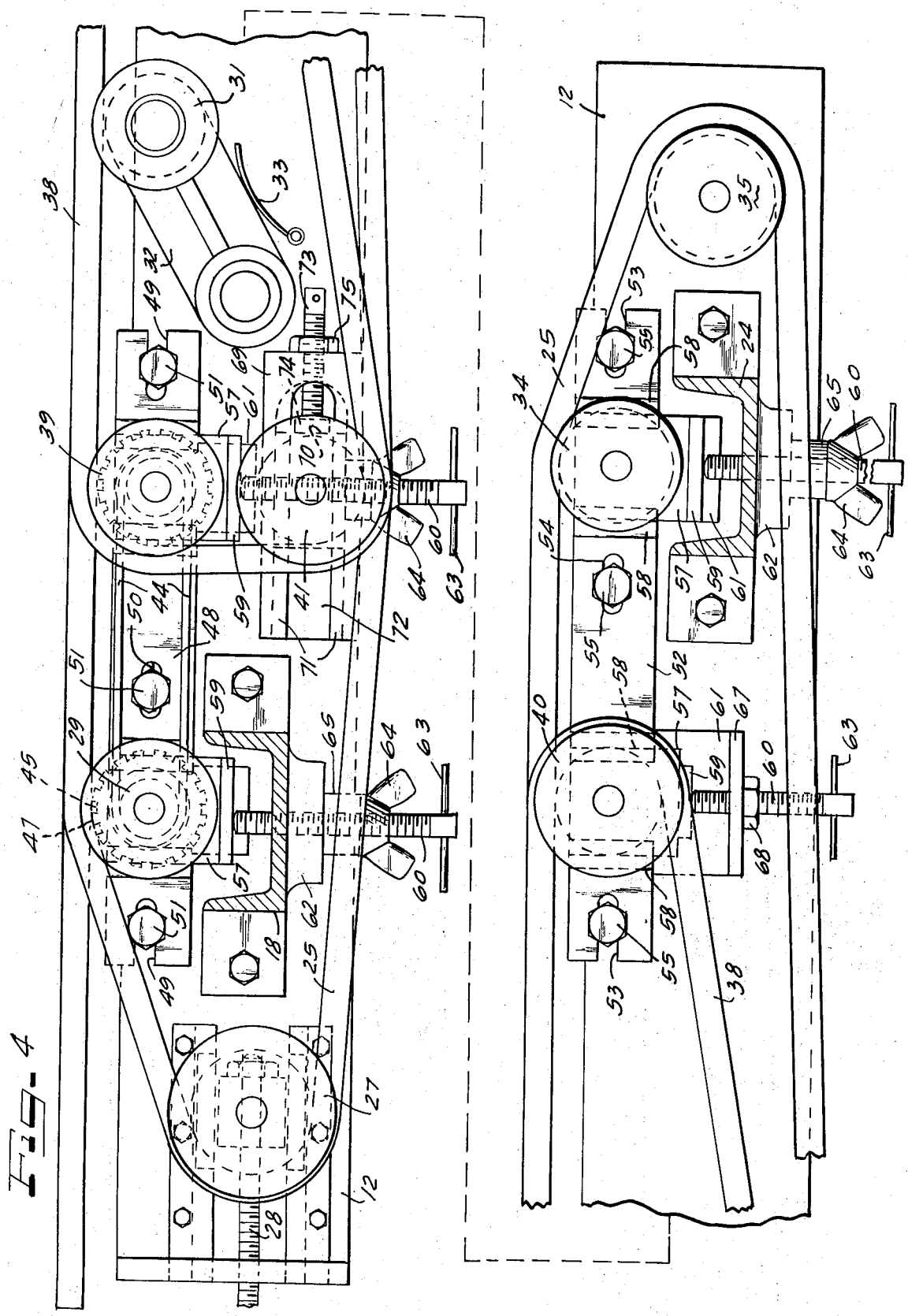

DEVICE FOR HANDLING ARTICLES SUCH AS BOTTLE OR JAR TYPE CONTAINERS

This invention relates to handling articles such as bottle or jar type containers and is more particularly concerned with a device and method especially useful in apparatus such as represented in U.S. Pat. No. 3,208,613 which, to the extent necessary, is incorporated herein by reference.

Apparatus according to said U.S. Pat. No. 3,208,613 has enjoyed excellent commercial success. According to that patent, containers such as bottles or jars are rapidly handled for cleaning out any foreign material such as bits of glass, packing material, and the like, prior to filling the containers with product and more particularly food products to avoid contamination. The containers are delivered to the machine open end up, are inverted, carried a substantial distance inverted while subjected to a shaking action, and then returned to upright position and transported away from the machine. Means are provided in the machine for adjusting for handling different diameters of containers. However, a problem has been encountered where the range of lengths of containers to be handled by the machine varies greatly so that while adequate adjustments can be made for diameter, and the containers handled efficiently within a substantial length range, some containers that may be, and has been desirable to handle in the machine are too short to be efficiently gripped by the endless flexible carriers which transport the containers in the inverted condition for treatment which may include not only shaking out debris or foreign material, but liquid or air washing or purging. The excessively short containers are gripped in only a short neck or end portion and with an excessive remaining portion projecting beyond the side of the flexible carriers so that an unstable condition of support of the containers tends to displace them from proper orientation while transported by the carriers. Such instability is especially obnoxious during the shaking effected while being thus transported.

Accordingly, it is an important object of the present invention to overcome the foregoing and other disadvantages and deficiencies, and to provide a new and improved method of and means for handling articles such as bottles and jars in a stable, efficient, advantageous manner.

Another object of the invention is to provide new and improved article handling device and method.

A further object of the invention is to provide a new and improved endless flexible carrier device for handling articles such as bottles and jars.

Still another object of the invention is to stabilize the transporting of articles by means of flexible endless carriers from which excessive lengths of the articles might otherwise project.

A still further object of the invention is to provide new and improved method of means for stabilizing the support of articles which project excessively from a side of gripping flexible carriers during treatment such as may be effected in a turn-over jar cleaner of the type represented in U.S. Pat. No. 3,208,613.

Other objects, features and advantages of the invention will be readily apparent from the following description of a preferred embodiment thereof, taken in conjunction with the accompanying drawings, although variations and modifications may be effected without departing from the spirit and scope of the novel concepts embodied in the disclosure, and in which:

FIG. 1 is a fragmentary perspective view looking into the inversion end of a turn-over bottle or jar cleaner embodying features of the invention;

FIG. 2 is a schematic illustration of the flexible endless carrier transporting system involving features of the invention;

FIG. 3 is a fragmentary side elevational view showing one side of the system of FIG. 2;

FIG. 4 is a fragmental plan view taken substantially along the line IV—IV of FIG. 3;

FIG. 5 is a fragmentary sectional plan view taken substantially along the line V—V of FIG. 3; and FIG. 6 is a fragmentary sectional detail view taken substantially along the line VI—VI of FIG. 5.

By way of practical example of use of the present invention, FIG. 1 shows the inverter end of a turn-over bottle or jar cleaning machine 10 embodying principles of the machine disclosed in U.S. Pat. No. 3,208,613. Such a machine comprises a frame 11 supporting spaced parallel beams 12 which are suitably mounted on transverse shafts 13 to be relatively adjusted to control the space therebetween and thereby enable corresponding adjustment of a rotary inverter 14 to handle articles such as bottles and jars within a substantial range of diameters. For this purpose, the inverter comprises spaced, coaxial, confronting friction ring disks 15 and 16 mounted in axially slidable but corotative relation on a drive shaft 17 and suitably coupled with the beams 12 through respective standards 18 fixedly mounted on the beams. Driving of the shafts 17 is effected through means including a flexible drive 19 motivated by a prime mover 20 such as a motor and suitable gear reduction means. In addition, the drive shaft 17 drives a sprocket 21 over which is trained a link chain 22 which serves to drive a returner 23 at the opposite end of the machine and structurally substantially the counterpart of the inverter 14, there being provided suitable supporting shaft (not shown) similar to the shaft 17 carried by the frame 11, and space adjustment coupling with the beams 12 provided by standards 24, similar to the standards 18, fixed to the beams. In addition, the chain 22 serves in association with the inverter 14 and the returner 23 as a base support conveyor and depth gauge for the articles being handled.

In operation of the machine 10, the articles to be treated, i.e. bottles or jars to be inverted and cleaned, are received from the inverter 14 by and between main endless carriers 25 (FIGS. 1 and 2) in the form of endless belts having sponge rubber of suitable frictional and wearing qualities on gripping surfaces which function in face-to-face relation to grip and support the articles therebetween and transport the articles along a treatment path from the receiving end to the delivery end of the transporting runs of the carriers between the inverter and the returner. To this end, the flexible endless belt carriers 25 are operatively mounted on the respective beams 12 not only for coordinated spacing adjustments with the inverter 14 and the returner 23, but also for driving of the carriers in unison with the inverter and returner through driving coupling means (not shown) motivated by the driving unit 20. At the inverter end of the machine, the carriers 25 are trained to run over idler take-up pulleys 27 provided with suitable take-up adjustment means including screws 28. Adjacent to the pulleys 27 which are spaced suitably outwardly relative to the inverter 14, the carriers are convergently related to run toward and over idler pulleys 29 having their nip aligned with the bottom of the inverter 14 such that their nip brings the carriers 25 into proper alignment to receive and grip the articles 30 simultaneously as released from the returner (FIGS. 2 and 3). Thence the articles are transported by the carriers 25 along a substantial span wherein idler pulleys 31 relatively offset along the treatment path, mounted on pivot arms 32 and biased by means of springs 33 not only press the carriers 25 together in the article gripping relation but by reason of the offset relation of these pulleys cause the articles to be repeatedly shaken as the carrier belts move at fairly high speed toward the returner end of the machine. At the returner 23, the carriers 25 travel over fixed idler pulleys 34, the nip of which is aligned below the returner 23 to which the treated articles are released by divergence of the carriers 25 toward and over driving pulleys 35 provided with drive shaft 37 (FIG. 3) suitably drivingly coupled in a manner not here shown with the prime mover 20, but fully explained in U.S. Pat. No. 3,208,613. From the pulleys 35 the carriers 25 follow a return run to the pulleys 27.

As will be appreciated, a very thorough non-releasing grip must be maintained on the articles 30 as they are transported along the shaking run between the spring biased shaker idler pulleys 31. Where the articles 30 are of sufficient length such that when they are delivered by the inverter 14 they will be received and gripped by substantially the full width of the carriers 25, the thorough grip which will sustain and maintain the articles against displacement from or relative to the carriers will be accomplished. However, if the articles 30 are relatively short relative to the gauge depth of the inverter 14 such that only partial grip is effected between the carriers 25, as depicted, for example, in FIG. 3, an unstable supporting relationship is encountered when the articles reach the shaking pulleys 31 due to the mass of container projecting from the upper side of the carriers, in the absence of means for stabilizing the support to prevent displacement of the articles during shaking. Therefore, according to the present invention, supplemental carrying means are provided cooperating with the carriers 25 at the upper sides thereof for stabilizing support of the projecting articles. In a practical form, the supplemental carrying means comprise respective supplemental endless flexible belt carriers 38 trained to run cooperatively along and with the main endless flexible carriers 25 and in face-to-face relation to grip the projecting portions of the articles therebetween throughout the length of travel between the shaker idlers 31. In order to clear the inverter 14 and the returner 23, means are provided to run the respective supplemental carriers 38 in orbits which are inside and between the inverter and returner (FIGS. 2 and 3). Further, means operative to synchronize the run of the main and supplemental carriers are provided.

For aligned, coplanar running of the supplemental belt carriers 38 with the main carriers 25, each of the shaker pulleys 31 has an upper end supplemental pulley portion 31a in which the associated supplemental carrier 38 is trained. By having the main and supplemental carriers of the same thickness and the pulley grooves in both sections of the pulleys 31 identical in diameter, a substantially coplanar relation of the cooperative carriers is maintained along the article gripping and supporting runs thereof. In a practical form, where the width of the carrier belts 25 is about 2 inches, the carrier belts 38 may be about 1 inch in width.

To confine the orbit of the supplemental carriers 38, in each instance, in clearance relation inwardly relative to the inverter and returner, although the main carriers 25 have their orbital extremities necessarily at and preferably beyond the inverter and returner, additional vertical axis pulleys 39 and 40 (FIGS. 2, 3 and 4) are mounted on fixed axes adjacent to but spaced inwardly from the pulleys 29 and 34, respectively, and with their axes parallel along a longitudinal line so as to be engaged with not only the supplemental carriers 38 but also the carriers 25. For this purpose, the pulley 39 has an upper groove section 39a for running therein of the carrier belt 38 and a lower section groove 39b for running therein of the carrier belt 25. For the same purpose, the pulley 40 has an upper belt groove section 40a for the carrier 38 and a lower belt groove section 40b for the carrier 25. In addition, to run the supplemental carrier orbit freely in clearance relation about the shaker pulleys 31, an idler pulley 41 is provided for the return run of the carrier belt 38, spaced laterally from the pulley 39. This pulley 41 is also desirably of the dual belt groove type to accommodate both the main carrier 25 and the supplemental carrier 38.

Means for synchronizing running of the main and supplemental carriers 25 and 38 include non-slip structure on the pulley 39 in engagement with both of the belts comprising the carriers 25 and 38. To this end, as best shown in FIG. 3, both of the sections 39a and 39b have aligned longitudinal grooves 42 which are circumferentially spaced to provide intervening gripper ribs 43 which engage in non-lip relation with the backs of the belts trained thereover within the respective belt grooves or channels of the pulley.

Additional synchronizing means comprise a driving connection between the pulley 29 and the pulley 39. To this end, a flexible endless driving element 44 in the form of a narrow tensioned belt positively connects the pulleys drivingly by being trained to run in respective lower end belt groove or channel sections on the pulleys, as best seen in FIG. 3. In addition, the principal belt groove channel of the pulley 39, within which the main carrier 25 is engaged, is provided with longitudinal grooves 45 (FIG. 4) and intervening gripper ribs 47, matching and desirably sychronized in belt contacting sequence with the corresponding gripper ribs 43 of the pulley 39.

Means are provided for conveniently mounting and adjusting the several pulleys involved with the carrier belt 38 in each instance and certain of the associated pulleys. To this end, means for mounting the pulleys 29 and 39 as a preassembly comprises an elongated mounting bracket 48 having opposite end longitudinal bolt slots 49 and an intermediate longitudinal bolt slot 50 through which extend the shanks of anchoring bolts 51 by which the bracket is secured in proper position on the inner upper margin of the beam 12. A similar elongated mounting bracket 52 is provided for mounting the pulleys 34 and 40 as a preassembly, if desired, and provided with opposite end longitudinal bolt slots 53 and an intermediate elongated bolt slot 54 by which anchoring of the bracket by means of bolts 55 in proper position on the inner upper margin of the beam 12 is facilitated. The elongated bolt slots facilitate proper longitudinal adjustment of the brackets 52 and thereby proper location of the respective pulleys 29 and 34 relative to the inverter and returner, respectively.

Means are provided for transverse adjustment of the respective pulley of each pair mounted on the respective brackets 48 and 52. To this end, each of the pulleys 29 and 39 on the one hand, and 34 and 40 on the other hand, has its shaft on which the respective pulley is rotatably mounted, fixedly carried by a respective base slide 57 transversely slidably mounted in complementary gibs 58 and each provided with an upstanding thrust flange 59 on its inner end. Thereby a respective adjustment screw 60 for each of these pulleys is adapted to thrust against the flange 59 and push the slide 57 and thereby the associated pulley inwardly toward the carrier belt 25. This enables proper optimum adjustment of the opposite ends of the article gripping and supporting runs of the carriers 25 by adjustment of the pulleys 29 and 34, and proper planar coordination adjustment of the operating runs of the carriers 28 relative to the carriers 25 through adjustments of the pulleys 39 and 40. For stability, each of the brackets 48 and 52 has a lateral sliding base extension 61 under the respective slide 57.

Suitable means are provided for operatively mounting each of the adjustment screws 60. For example, the adjustment screw 60 for the pulley 34 is threadedly engaged through a boss 62(FIGS. 5 and 6) of the associated standard 24 which is desirably in the form of a structural channel. To facilitate threaded manipulation of the screw 60, it is provided on its outer end portion with suitably handle means such as a handle pin 63 which may be permanently secured or may be selectively attached thereto. For locking the adjustment screw 60 in any preferred adjusted position, a wing lock nut 64 may be provided which is adapted to engage lockingly against a spacer 65 thrusting against the boss 62 and maintaining the wing nut clear of the adjacent edge of the beam 12.

In respect to the adjustment screw 60 for the pulley 40, a fixed threaded support is provided by an upstanding flange 67 (FIGS. 3 and 4) on the outer end of the associated base extension 61 from the bracket 52, with a lock nut 68 engaged on the screw 60 and thrusting against the flange 67 when proper adjustment of the pulley 40 has been effected.

In respect to the adjustment screw 60 for the pulley 29, substantially the same arrangement is provided as that associated with the pulley 34. That is, the screw 60 is threadedly engaged through a boss 62 on the lower end portion of the standard 18 which, similarly as the standard 24, is desirably in the form of a structural channel bar. To retain the adjusted position of the screw 60, the associated wing nut 64 thrusts against a spacer 65 thrusting against the boss 62.

Adjustment manipulation of the screw 60 for the pulley 39 is enabled by having the same threaded through the lower portion of a mounting block 69 for the pulley 41. Inasmuch as the outer edge of the block 69 is aligned with the edge of the beam 12, the locking wing nut 64 may thrust directly against the outer face of the block in the adjusted position of the screw 60 with which associated.

Take-up adjustment of the pulley 41 is effected by means of a slide base 70 (FIGS. 3 and 4) to which the shaft on which the pulley 41 rotates is fixedly attached and which slide is engaged in gibs 71 which may be machined in each side of a longitudinal slideway groove 72 in the upper face of the block 69 parallel to the axis of the beam 12. Take-up or belt tensioning adjustment of the pulley 41 is thereby adapted to be effected by means of a take-up screw 73 threaded into the end of the block 69 and extending into the inner end of the groove 72 to thrust against an upstanding thrust flange 74 on the adjacent end of the slide 70, much the same as the thrust flanges 59 of the slides for the pulleys mounted on the brackets 48 and 52. Adjustment position of the screw 73 is adapted to be maintained by a lock nut 75.

It will be understood that variations and modifications may be effected without departing from the spirit and scope of the novel concepts of this invention.

I claim as my invention

1. Apparatus for handling articles in the nature of containers having one end closed and the opposite end open;

a supporting frame having a horizontal elongated frame portion and upright frame portions adjacent to opposite ends of the horizontal frame portion;

a container inverter carried by one of said upright frame portions;

a container returner carried by the other of said upright frame portions;

endless main carriers trained over and about spaced pulleys mounted on said horizontal frame portions in outward clearance relation to respectively said inverter and said returner adjacent to said upright frame portions at opposite ends of said horizontal frame portions and supporting the main carriers in elongated orbits;

respective cooperating pairs of guide pulleys on said frame portions with one pair having its nip generally aligned with the inverter and another pair having its nip aligned with the returner, the main carriers extending obliquely relative to said spaced pulleys and running about substantial arcs of the perimeters of said guide pulleys and extending between the pairs of guide pulleys in face-to-face article supporting and carrying runs to receive containers from the inverter open end down between said runs to transport the containers to the returners;

means for driving certain of said spaced pulleys to drive said carriers in unison;

supplemental flexible endless carriers having shorter elongated orbits than said main carriers and providing face-to-face article supporting and carrying runs above and parallel to said runs of the main carriers;

pulleys on said horizontal frame portions spaced in inward clearance relation from said guide pulleys and said inverter and returner and about which said supplemental carriers are trained and maintaining the carrying runs of the supplemental carriers aligned with the carrying runs of the main carriers;

and endless flexible driving means connecting and effecting synchronized driving of the guide pulleys and the supplemental carrier pulleys at one end of said orbits and thereby synchronizing running of said main carriers and the supplemental carriers.

2. Apparatus according to claim 1, including traction ribs on said guide pulleys to assure synchronized driving of the guide pulleys by the running thereover of said main carriers.

3. Apparatus according to claim 1, wherein said guide pulleys and said supplemental carrier pulleys connected by the flexible endless driving means have lower end rotary elements coupled therewith, and said endless members being trained about said elements.

4. Apparatus according to claim 1, including mounting brackets supporting thereon said guide pulleys and the supplemental carrier pulleys, and means securing said brackets to said frame portions.

5. Apparatus according to claim 4, including means relatively adjustably mounted on said brackets and carrying said guide pulleys and said supplemental carrier pulleys, and means for adjusting said pulley supporting means and thereby the pulleys relative to said brackets.

6. Apparatus according to claim 5, wherein said adjusting means are individual for the respective pulley carrying means on the brackets, whereby the supplemental carrier pulleys can be adjusted relative to the guide pulleys.

7. Apparatus according to claim 4, including means adjustably mounted on said brackets and carrying said supplemental carrier pulleys, and means for effecting adjustments of the supplemental carrier pulley carrying means on the brackets whereby the supplemental carrier pulleys can be adjusted relative to said guide pulleys.

8. Apparatus for handling articles in the nature of containers having one end closed and the opposite end open;

a supporting frame having a horizontal elongated frame portion and upright frame portions adjacent to opposite ends of the horizontal frame portion;

a container inverter carried by one of said upright frame portions;

a container returner carried by the other of said upright frame portions;

endless main carriers trained over and about spaced pulleys mounted on said horizontal frame portions in outward clearance relation to respectively said inverter and said returner adjacent to said upright frame portions at opposite ends of said horizontal frame portions and supporting the main carriers in elongated orbits;

respective cooperating pairs of guide pulleys on said frame portions with one pair having its nip generally aligned with the inverter and another pair of having its nip aligned with the returner, the main carriers extending obliquely relative to said spaced pulleys and running about substantial arcs of the perimeters of said guide pulleys and extending between the pairs of guide pulleys in face-to-face article supporting and carrying runs to receive containers from the inverter open end down between said runs to transport the containers to the returners;

means for driving certain of said spaced pulleys to drive said carriers in unison;

supplemental flexible endless carriers having shorter elongated orbits than said main carriers and providing face-to-face article supporting and carrying runs above and parallel to said runs of the main carriers;

pulleys on said horizontal frame portions spaced in inward clearance relation from said guide pulleys on said inverter and returner and about which said supplemental carriers are trained and maintaining the carrying runs of the supplemental carriers aligned with the carrying runs of the main carriers;

endless flexible driving means connecting and effecting synchronized driving of the guide pulleys and the supplemental carrier pulleys at one end of said orbits and thereby synchronizing running of said main carriers and the supplemental carriers;

means for effecting adjustments of said supplemental carrier pulleys in a direction transverse to said runs to effect transverse positional adjustments of the supplemental carrier runs relative to the main carrier runs;

tensioning pulleys engaged by said supplemental carriers;

means mounting said tensioning pulleys on said horizontal frame portion; and means for adjusting said tensioning pulley mounting means to effect supplemental carrier tensioning adjustments of said tensioning pulleys.

9. Apparatus according to claim 8, including mounting brackets having pulley supporting means on which said supplemental carrier pulleys are mounted, and means securing said brackets to said horizontal frame portions.

10. Apparatus according to claim 9, including means carried by said brackets for effecting said adjustments of the supplemental carrier pulleys.

11. Apparatus according to claim 10, wherein said adjusting means comprise respective adjustment screws and means for locking the adjustment screws in adjusted condition.

12. Apparatus according to claim 10, including adjustment screws for effecting said adjustments of the supplemental carrier pulley supporting means, and means carried by said brackets supporting said adjustment screws in adjusting relation to the supplemental carrier pulley supporting means.

* * * * *